United States Patent [19]

Dahlstrom

[11] Patent Number: 5,110,149
[45] Date of Patent: May 5, 1992

[54] TRAILER SYSTEM DESIGN FOR ENHANCED LOAD-CARRYING CAPACITY AND MANEUVERABILITY

[76] Inventor: Gale E. Dahlstrom, P.O. Box 57, Hoquiam, Wash. 98550

[21] Appl. No.: 126,363
[22] Filed: Nov. 30, 1987
[51] Int. Cl.$^5$ .............................................. B60P 3/40
[52] U.S. Cl. ..................................... 280/401; 280/404
[58] Field of Search ............... 280/400, 401, 402, 404, 280/405 R, 405 A, 414.5, 415 R, 423 R, 446.1, 81 R, 81 A, 81 B

[56] References Cited

U.S. PATENT DOCUMENTS

| | | | |
|---|---|---|---|
| 1,542,973 | 6/1925 | Utter | 280/404 |
| 1,970,967 | 8/1934 | Maust | 280/401 |
| 2,375,970 | 5/1945 | Williams, Jr. | 280/479 A |
| 3,087,744 | 4/1963 | Tanenbaum | 280/404 |
| 3,150,734 | 9/1964 | Duggar, Jr. | 180/11 |
| 3,517,944 | 6/1970 | Hage | 280/414.5 |
| 3,734,541 | 5/1973 | Burroughs | 280/506 |
| 3,912,293 | 10/1975 | Harbers | 280/405 R |
| 4,219,210 | 8/1980 | Genberg | 280/401 |
| 4,496,166 | 1/1985 | Anderson | 280/401 |

FOREIGN PATENT DOCUMENTS

| | | | |
|---|---|---|---|
| 977000 | 10/1975 | Canada | 280/401 |
| 622196 | 11/1935 | Fed. Rep. of Germany | 280/204 |
| 472829 | 8/1975 | U.S.S.R. | 280/401 |

Primary Examiner—Mitchell J. Hill
Attorney, Agent, or Firm—Christensen, O'Connor, Johnson & Kindness

[57] ABSTRACT

A trailer system 10 is disclosed that offers enhanced load carrying capacity and maneuverability. The system includes primary and auxiliary trailers 28 and 30. The primary trailer 28 includes a bed assembly 36 that pivots about a horizontal bar 50 securing it to the primary trailer support assembly 34. The auxiliary trailer 30 is secured by vertical pins 164 and 184 and horizontal plates 96, 160, and 180 to the primary trailer 28. An air cushion system 32 controls the pivotal relationship between the bed assembly 36 and support assembly 34, allowing the auxiliary trailer 30 to be pivoted upward off the ground in connection with a sliding support system for weight transfer. As a result, it is easier to control the trailer system 10 when backed up. A reach 42, which connects the primary trailer 28 to a truck 12, can be extended rearwardly through guides 100 and 166 in the primary trailer bed assembly 36 and auxiliary trailer 30, respectively, securing the trailer system 10 for lifting as a unit to the bed 20 of truck 12 when empty. An adjustable hitch assembly 26 is included on truck 12 to allow the trailer system 10 to be conveniently coupled and uncoupled from truck 12 regardless of slight variations in surrounding terrain.

14 Claims, 6 Drawing Sheets

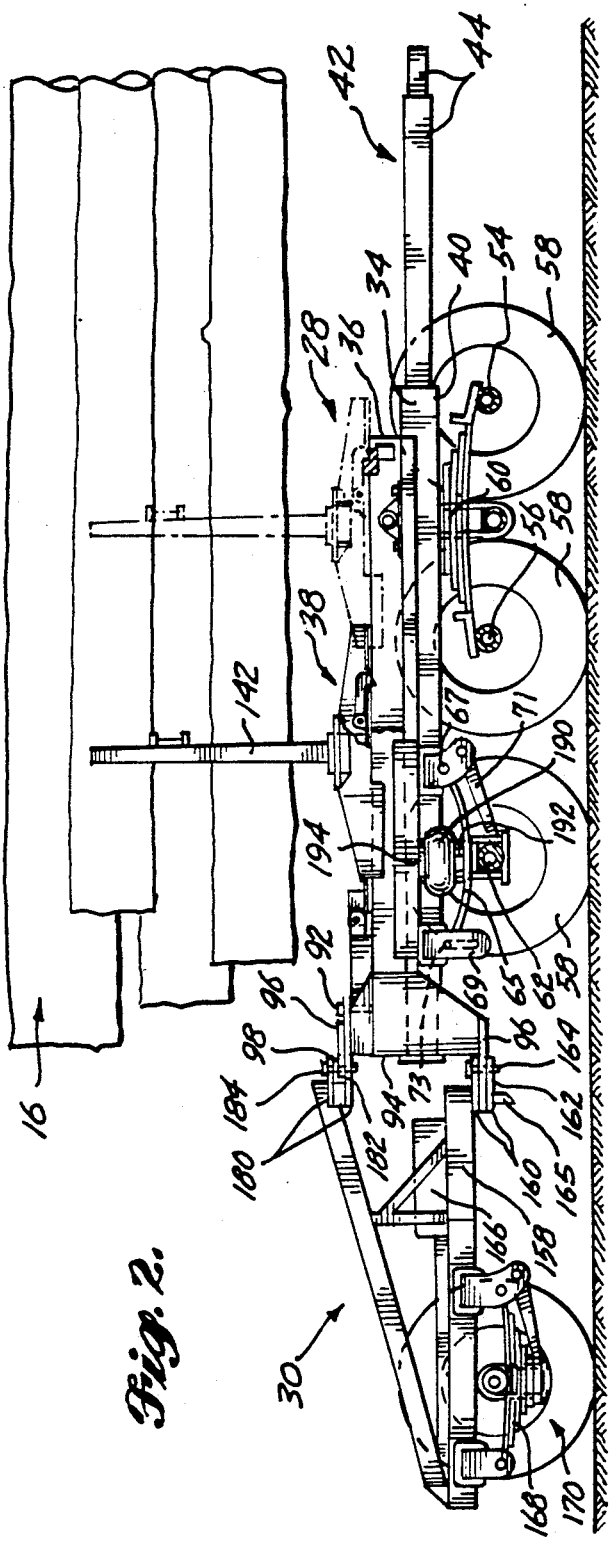
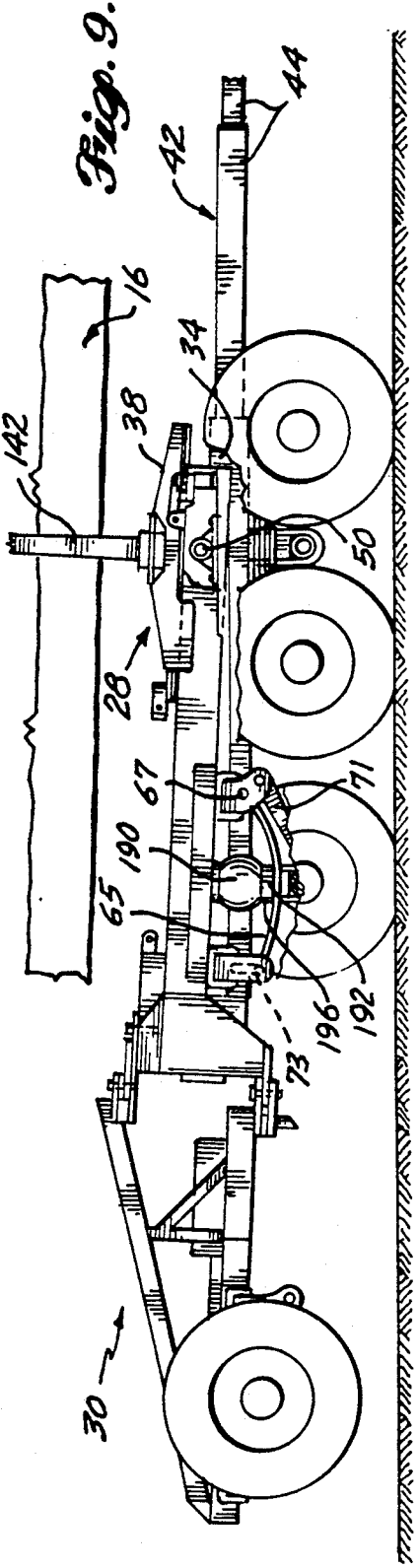

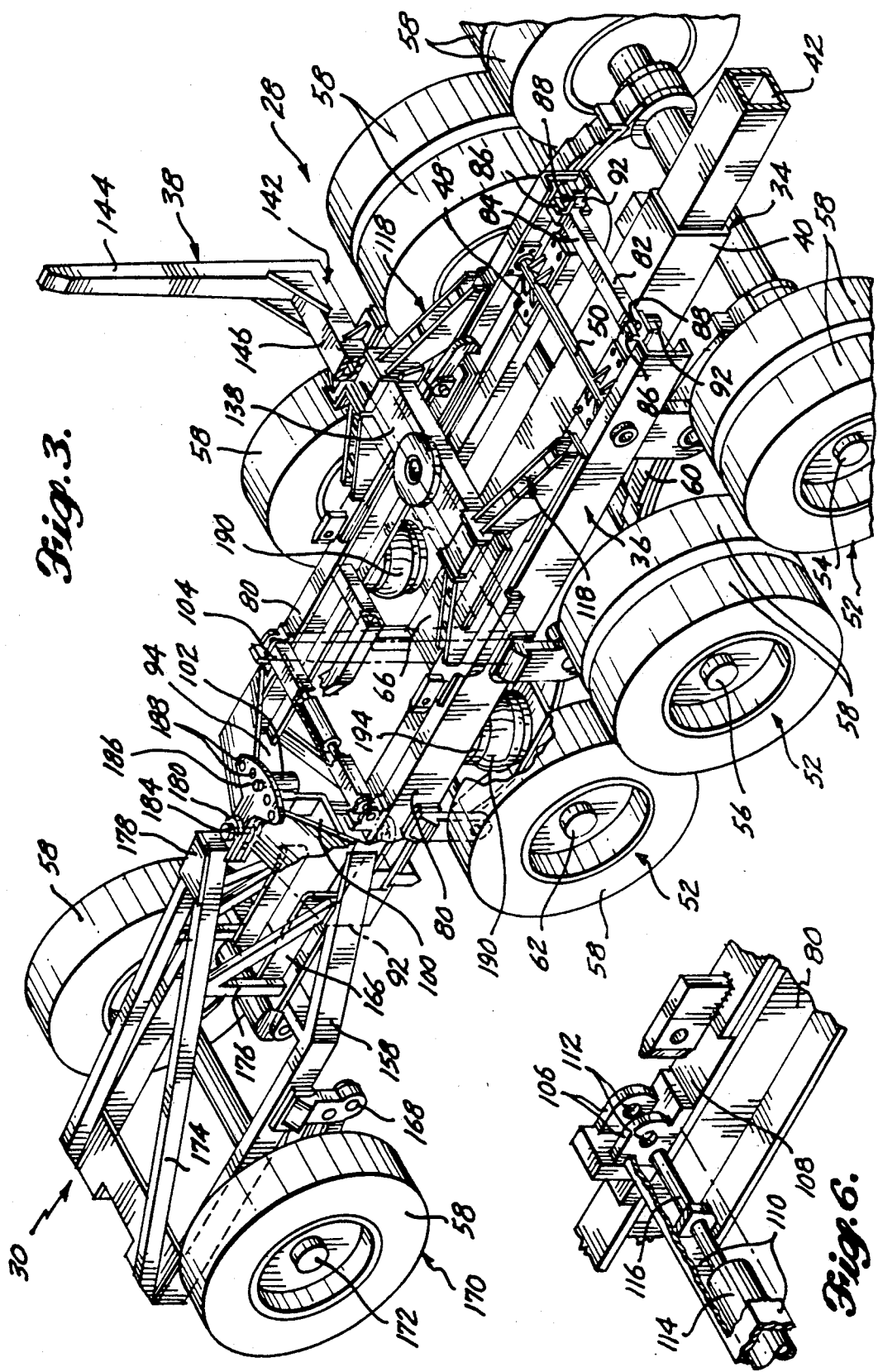

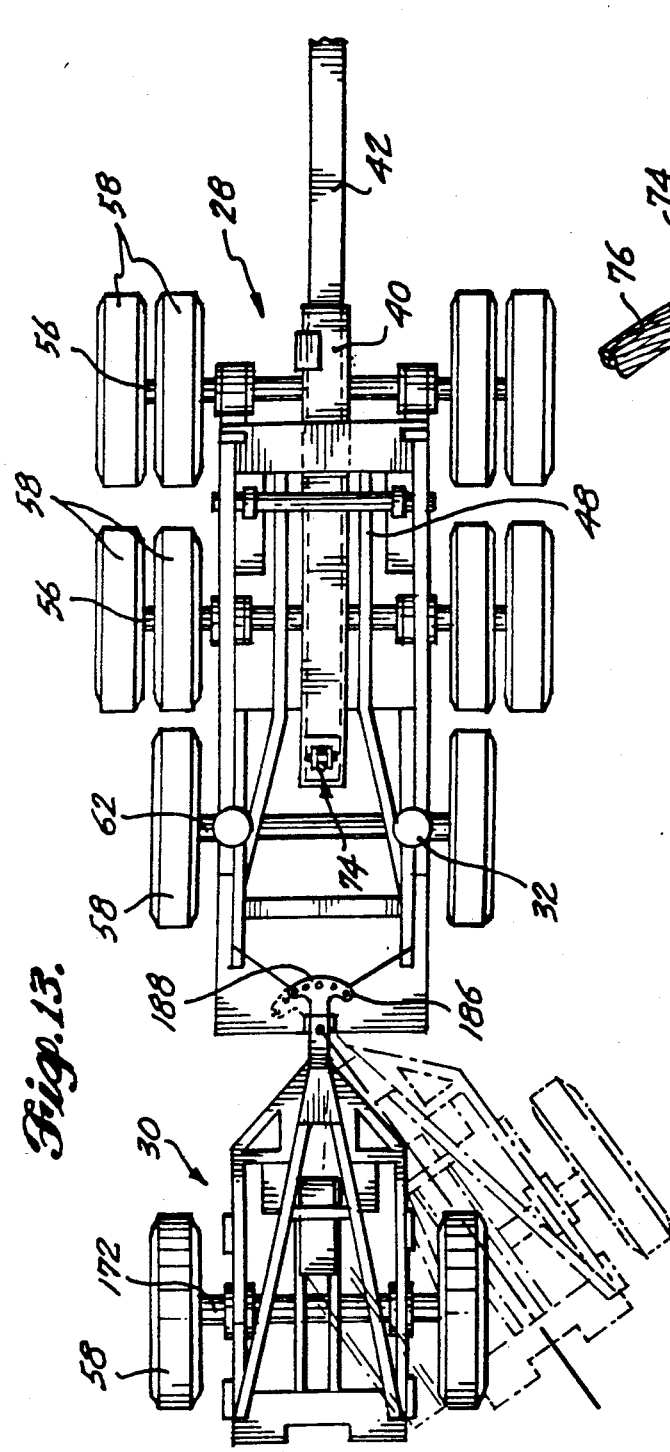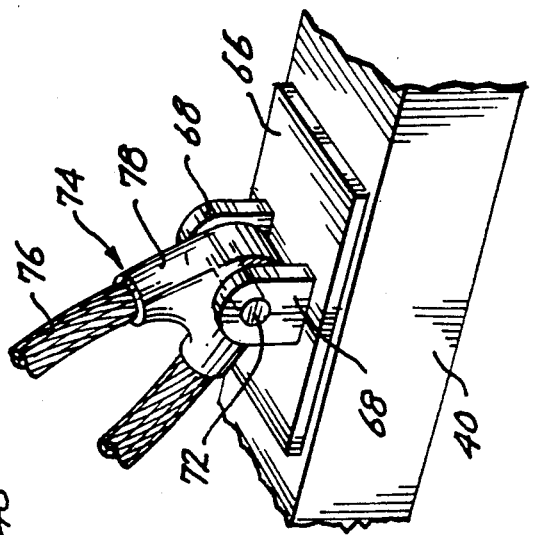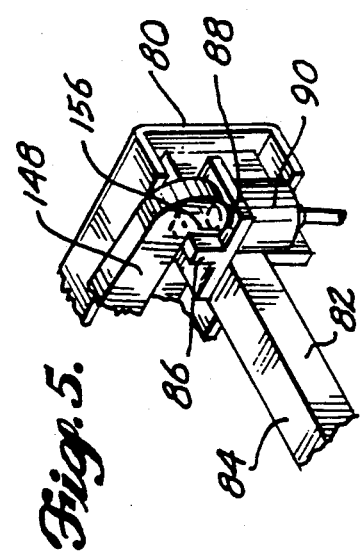

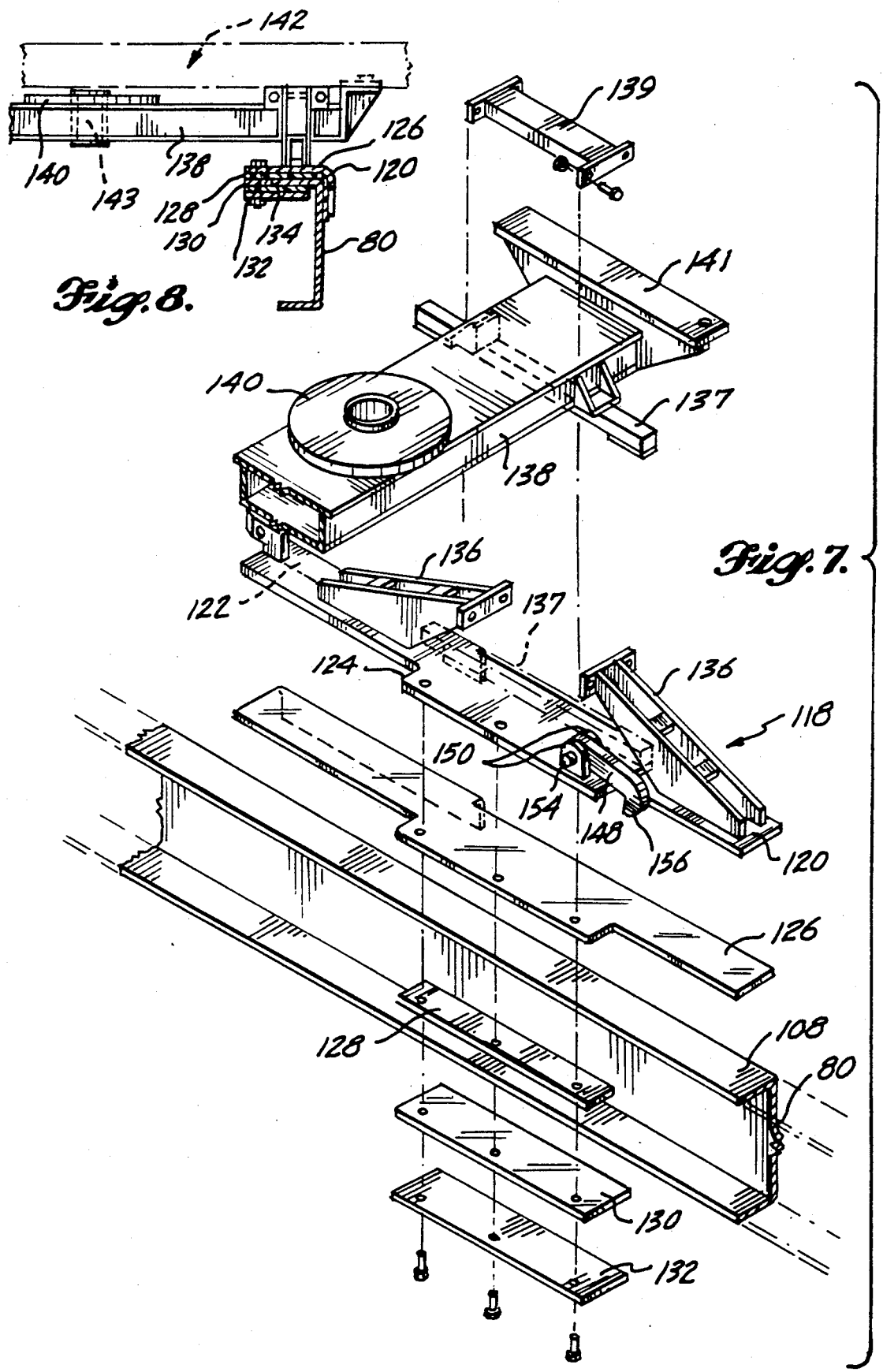

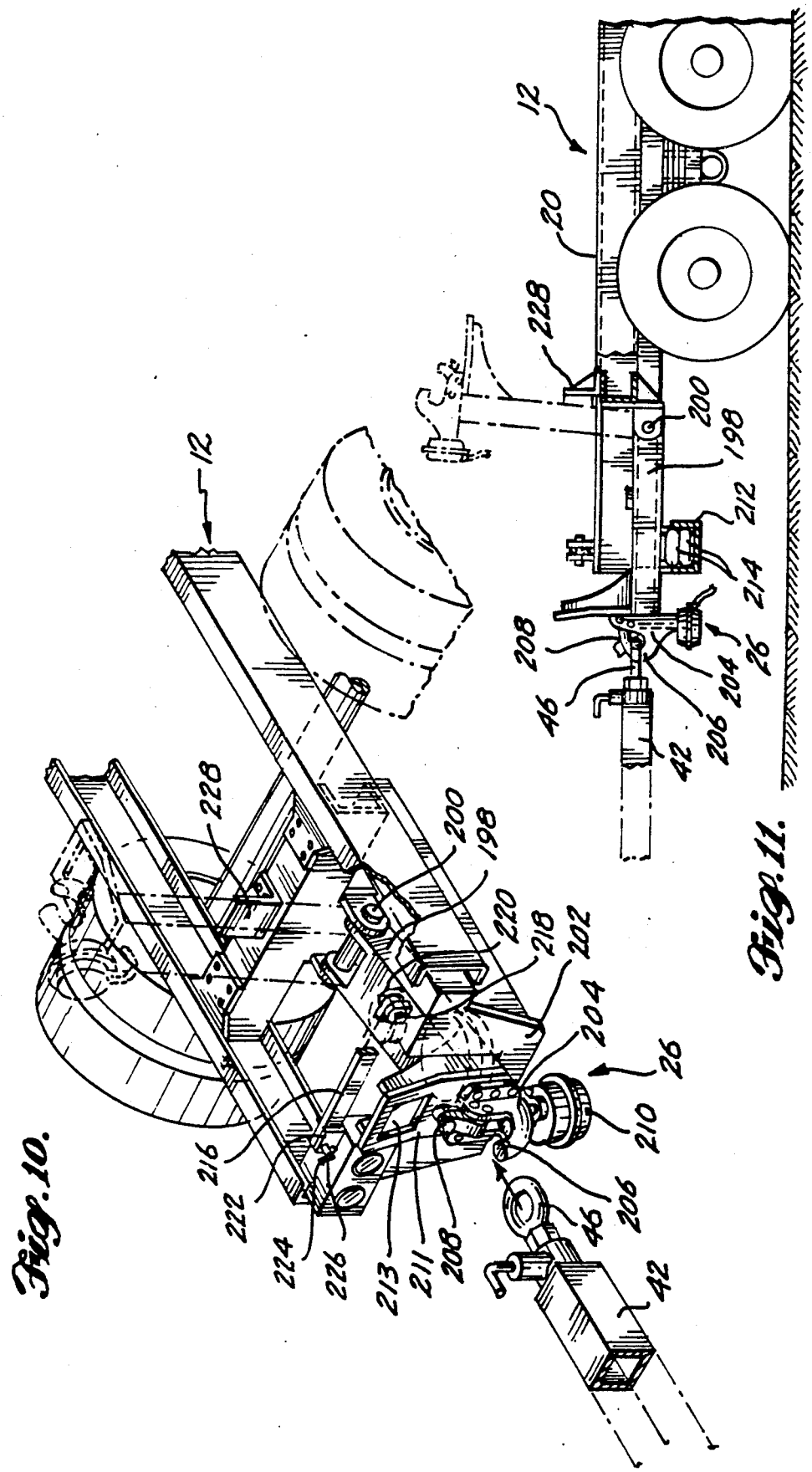

TRAILER SYSTEM DESIGN FOR ENHANCED LOAD-CARRYING CAPACITY AND MANEUVERABILITY

FIELD OF THE INVENTION

This invention relates generally to load transportation equipment and, more particularly, to trailer systems for transporting loads.

BACKGROUND OF THE INVENTION

Logs are normally transported from a logging site to a sawmill or other destination by a relatively large truck-and-trailer combination. The truck includes a rearwardly extending bed equipped with an upwardly projecting, substantially U-shaped frame known as a bunk. The trailer is disengageably connectable to the truck by a relatively long, telescopic reach and also includes an upwardly extending U-shaped bunk. Axle-and-wheel assemblies, provided on both the truck and trailer, support the combination and distribute its weight over the roadway.

When a load of logs is to be hauled, the reach is first extended to provide a desired spacing between the truck and trailer bunks. The truck and trailer hitches are then appropriately coupled and logs are loaded and secured to the truck and trailer bunks. At this time, the logs are ready to be transported to, for example, a sawmill and their weight is relatively uniformly dispersed over the roadway. At the sawmill, the logs are unloaded and the truck-and-trailer combination is made ready to return to the logging site for another load of logs.

As will be appreciated, the trailer serves no load-carrying function during a return to the logging site. Moreover, the trailer is an impediment to maneuverability, particularly given the typically narrow, winding nature of logging roads. For that reason, prior art truck-and-trailer combinations have provided for the placement of the trailer on top of the truck bed prior to the combination being returned to the logging site. As a result, the maneuverability of the combination is significantly improved for the return trip. When this "piggyback" combination reaches the logging site, the trailer is hoisted from the truck bed by conventional logging equipment and is reconnected to the truck so that another load of logs can be hauled.

Given the extreme weight of the loads to be hauled by such truck-and-trailer combinations, it is frequently desirable to distribute the load over as many axle-and-wheel assemblies as possible. With multiple fixed axle-and-wheel assemblies provided on a single trailer, however, the tracking ability of the trailer is decreased significantly. More particularly, because such axle-and-wheel assemblies do not parallel the front wheels of the truck during a turn, they introduce a drag resistance that must be overcome by the truck. Drag resistance increases in proportion to the number of axle-and-wheel assemblies included on the trailer and, at some point, becomes intolerably large. The problem of reduced tracking ability is particularly acute for trailer systems that are required to negotiate the narrow, sharp curves frequently encountered on logging roads.

As an alternative, auxiliary or secondary trailers have been included to distribute the weight of the load across additional axle-and-wheel assemblies. Because the trailers are pivotally connected, the additional axle-and-wheel assemblies offer less drag resistance during a turn than they would if coupled directly to the first trailer.

While double-trailer configurations are relatively widely used, they are not without disadvantage. For example, the addition of an auxiliary trailer decreases maneuverability significantly when the truck-and-trailer is driven backwards. Further, in applications where the empty trailer is to be positioned upon the truck bed for transportation to a loading site, the addition of another trailer may result in an unwieldy and uncontrollable assembly that is difficult to load and that may further result in equipment damage or personal injury.

Another problem frequently encountered in the transportation of loads with trailers is presented by the existence of terrain variations at the loading or unloading site. More particularly, if the truck and trailer are loaded on uneven ground, it may be difficult to couple or uncouple the hitches. In some circumstances, the terrain variations may be so pronounced that the equipment must either be moved to level ground or a leveling adjustment performed.

In light of the foregoing observations, it would be desirable to provide a trailer system that offers enhanced load-carrying capacity, without adversely affecting the maneuverability of the truck-and-trailer combination. In addition, it would be helpful to provide a trailer system that can be easily loaded and unloaded from a truck bed when empty. Finally, it would be advantageous for the truck and trailer hitches to be easily coupleable independent of terrain variations below the truck and trailer.

SUMMARY OF THE INVENTION

In accordance with this invention, a trailer system is provided for supporting a load and allowing the load to be transported with the aid of a vehicle. The system includes a load-contacting trailer for movably supporting the load. The load-contacting trailer has a bed assembly for contacting and supporting the load and an axle-and-wheel assembly that is coupled to the bed assembly to movably support the bed assembly. A connection device connects the load-contacting trailer to the vehicle. An auxiliary trailer, coupled to the load-contacting trailer, provides additional support of the load. The auxiliary trailer includes an axle-and-wheel assembly upon which it is movably supported. Finally, an apparatus is included for raising the axle-and-wheel assembly of the auxiliary trailer relative to the axle-and-wheel assembly of the load-contacting trailer for enhanced maneuverability when the trailer system is to be moved backwards by the vehicle.

In accordance with another aspect of this invention, a trailer system is provided for supporting a load and allowing the load to be transported with the aid of a vehicle. This system includes a load-contacting trailer for contacting and movably supporting the load. An auxiliary trailer is coupled to the load-contacting trailer for additionally movably supporting the load. The system further includes a reach for connecting the load-contacting trailer to the vehicle. The reach is selectively positionable between extended and retracted positions and cooperatively engages the auxiliary trailer when in the retracted position to relatively securely connect and align the load-contacting trailer and auxiliary trailer.

In accordance with a further aspect of this invention, a hitch is disclosed that is securable to a vehicle and that is for use in connecting the trailer to the vehicle. The hitch includes an arm having first and second ends, with the first end being pivotably securable to the vehicle. A hitch element is secured to the second end of the arm and is for cooperatively engaging the trailer. The hitch also includes a support member that is securable to the vehicle, providing a support surface positionable below the arm intermediate the first and second ends of the arm. Finally, an air bag is included and is positionable between the support surface of the support member and the arm. The air bag is designed to receive air at varying pressures to effect changes in the relative position of the arm support structure.

BRIEF DESCRIPTION OF THE DRAWINGS

The invention will presently be described in greater detail, by way of example, with reference to the accompanying drawings, wherein:

FIG. 2 is a side view of the trailer system of FIG. 1, illustrating a sliding bunk assembly provided on the primary trailer locked in forward and rearward positions;

FIG. 3 is a pictorial view of the trailer system of FIG. 1;

FIG. 4 is a partial pictorial view of a lift ring assembly used to lift the trailer system of FIG. 1;

FIG. 5 is a partial pictorial view of a mechanism for locking the sliding bunk assembly provided on the primary trailer in its forward position, as shown in FIG. 2;

FIG. 6 is a partial pictorial view of a mechanism for locking the sliding bunk assembly in its rearward position, as shown in FIG. 2;

FIG. 7 is an exploded view of a position of the sliding bunk assembly provided on the primary trailer;

FIG. 8 is a partial sectional view of the sliding bunk assembly attached to the primary trailer;

FIG. 9 is a side view of the log trailer system of FIG. 1 adjusted to raise the auxiliary trailer, allowing the system to be more easily controlled when moved backwards;

FIG. 10 is a pictorial view of a hitch constructed in accordance with this invention for connecting the trailer system to the truck;

FIG. 11 is a side view of the hitch of FIG. 10 with the hitch element being depicted in raised and lowered conditions.

FIG. 13 is a top view of the trailer system of FIG. 1 illustrating the manner in which the position of the auxiliary trailer with respect to the primary trailer is secured when lifted.

DETAILED DESCRIPTION OF THE PREFERRED EMBODIMENT OF THE INVENTION

Figure 1:
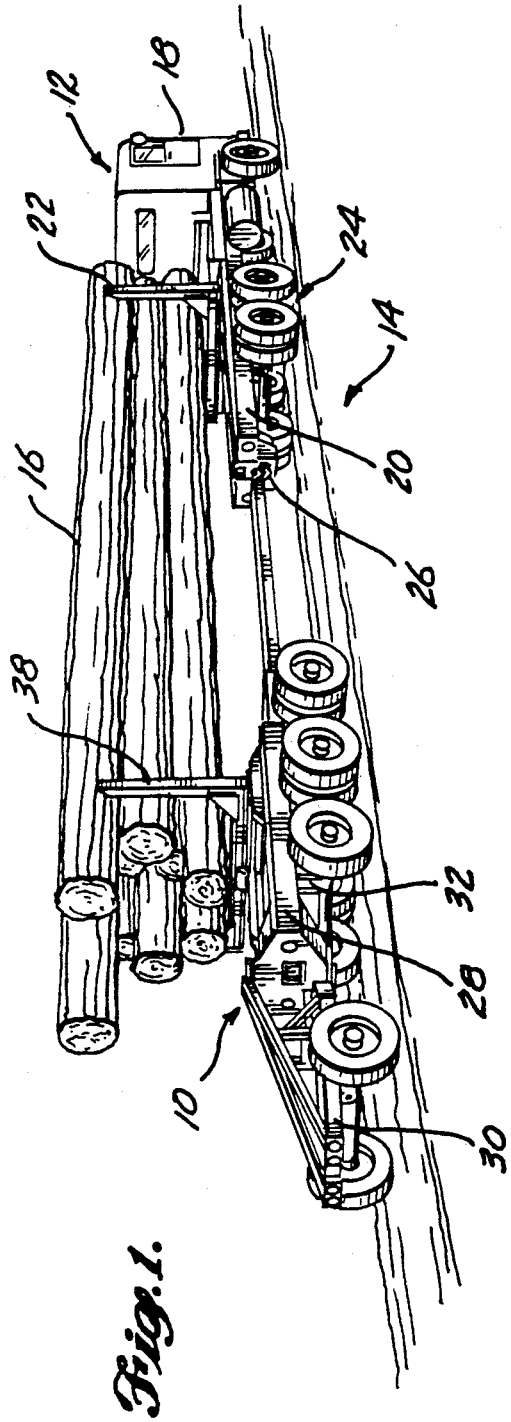
FIG. 1 is a pictorial view of a log trailer system, including primary and auxiliary trailers constructed in accordance with this invention, attached to a truck.

Referring now to FIG. 1, a trailer system 10 constructed in accordance with this invention is shown coupled to a truck 12. Together, they form a truck-and-trailer combination 14 that is suitable for the transportation of a load, such as logs 16. As will be described in greater detail below, the design of trailer system 10 enhances the load-carrying capacity of the combination 14 significantly, without decreasing its maneuverability when backed up. In addition, trailer system 10 is easily rigidly secured for lifting and storage on the truck 12 when empty. Finally, the trailer system 10 and truck 12 are easily connected or disconnected, regardless of variations in the underlying terrain.

Reviewing now the basic elements of combination 14, as shown in FIG. 1, truck 12 includes a cab section 18 that houses, among other things, a passenger compartment and a suitable engine. A bed 20 extends rearwardly from the cab section 18 and includes an upwardly projecting, U-shaped bunk 22 designed to receive logs positioned longitudinally with respect to bed 20. A plurality of axle-and-wheel assemblies 24, at least one of which is coupled to the engine by a drive train, support truck 12 for motion with respect to a roadway. Finally, an adjustable hitch assembly 26 is included for coupling truck 12 and trailer system 10.

Briefly reviewing the elements of trailer system 10, as shown in FIG. 1, system 10 includes a primary trailer 28 that engages and movably supports a portion of logs 16. An auxiliary trailer 30, which does not contact logs 16, is attached to the end of primary trailer 28 to give system 10 additional load-carrying capacity. An air cushion system 32 is also included in the trailer system 10 to lift the auxiliary trailer 30 with respect to at least a portion of the primary trailer 28.

Addressing the elements of trailer system 10 in greater detail, reference is had to FIGS. 2 and 3. As shown, primary trailer 28 includes a support assembly 34 to which a bed assembly 36 is pivotally secured about a horizontal axis. A bunk assembly 38 slidably engages the bed assembly 36 and is designed to pivotably receive the logs 16 and slidably transfer their weight depending on the operating mode of trailer 28.

As shown in FIGS. 2 and 3, the trailer support assembly 34 includes a central, longitudinally extending, hollow reach housing 40 of square cross section. Reach housing 40 extends behind the front end of primary trailer 28 a distance less than the overall length of trailer 28. Reach housing 40 slidably receives a telescoping reach 42, which includes a plurality of sections 44 and terminates at its forward end in a horizontally disposed hitch eyelet 46 (see FIG. 10). As will be discussed in greater detail below, reach 42 can be extended either forward or rearward of the primary trailer 28.

Coupled to reach housing 40 is a support structure 48 that allows the various other elements of primary trailer 28 to be connected to reach housing 40. For example, a pivot bar 50 is attached to reach housing 40 by support structure 48. As shown in FIG. 3, the pivot bar 50 is supported slightly above reach housing 40 near the forward end of primary trailer 28. Pivot bar 50 is perpendicular to, and centered about, reach housing 40 and is secured by support structure 48 against rotation. As will be discussed below, pivot bar 50 connects the bed assembly 36 of trailer 28 to the support assembly 34.

Also coupled to reach housing 40 by support structure 48 are a number of axle-and-wheel assemblies 52. More particularly, as shown in FIGS. 2 and 3, a forward axle 54 and center axle 56 are equally spaced below reach housing 40 on opposite sides of pivot bar 50. Two wheels 58 are included on each end of axles 54 and 56. Axles 54 and 56 are coupled to support structure 48 by a common suspension system 60.

A rear axle 62 is also coupled to reach housing 40 by bed assembly 36 and support structure 48. In the arrangement shown, the rear axle 62 is spaced rearwardly of center axle 56 a distance equal to the spacing of axles 54 and 56. One wheel 58 is included on each end of axle 62, which is coupled to support structure 48 by a separate suspension system 64 and bed assembly 36.

More particularly, as shown in FIG. 2, each side of the rear axle suspension system 64 includes a leaf spring 65 having a first end that is pivotably secured to a forward bed mount 67 and a second end that is slidably received within a rear bed mount 69. An attachment to axle 62 is provided on leaf spring 65 midway between its two ends. Axle 62 is also pivotably coupled to the forward mount 67 by an adjustable control arm 71, which allows the relative position of the axle 62 to be adjusted. A crossbar 73 extends between the rear mounts 69 for stability. As will be discussed in greater detail below, a rear axle suspension system 64 constructed in this manner, provides a desired suspension of axle 62, keeping axle 62 aligned as trailer system 10 turns a corner and allowing air cushion system 32 to lift auxiliary trailer 30 free of the weight of the rear axle-and-wheel assembly 52.

Spaced slightly forward of rear axle 62 and secured to the top of reach housing 40 is a trailer system lift plate 66. As shown in greater detail in FIG. 4, a pair of laterally spaced, pin plates 68 project upwardly from lift plate 66 and include horizontally aligned openings 70 through which a pin 72 can be passed. A lift ring assembly 74, including a cable loop 76 passed through a collar plate 78, is coupled to the pin plates 68 by pin 72. A collar end of plate 78 forms a predetermined radius for the cable loop 76, while the other end is dimensioned for receipt between pin plates 68 and includes an opening corresponding in diameter to openings 70. With pin 72 passed through each of the aligned openings in plates 68 and 78, the lift ring assembly 74 is securely attached to lift plate 66 and reach housing 40.

Turning now to a discussion of the bed assembly 36 of the primary trailer 28, reference is again had to FIG. 3. As shown, bed assembly 36 includes a pair of side rails 80 having an inwardly opened, channeled construction that is substantially U-shaped in cross section. The side rails 80 are pivotally secured to the pivot bar 50 near their forward ends, allowing the bed assembly 36 to pivot with respect to support assembly 34.

As shown in FIGS. 3 and 5, a forward end piece 82 joins the side rails 80 at the forward end of the bed assembly 36. An upper surface 84 of the forward end piece 82 includes a front bunk latch plate 86 positioned at each end of end piece 82 slightly inwardly from the side rails 80. A vertically disposed opening 88 passes through the upper surface 84 of end piece 82 slightly forward of each latch plate 86 and is designed to receivably engage the vertically extendable actuator rod of a pneumatic bunk latch release 90 located below end piece 82.

The rear ends of side rails 80 are connected by a rear end piece 92 shown in FIGS. 2 and 3. End piece 92 includes a vertically disposed, roughly octagonal end plate 94 that extends above and below the side rails 80 and runs parallel to their rear ends. As shown, a pair of trailer coupling plates 96 extend rearwardly from the top and bottom of the octagonal end plate 94. The projecting portion of each coupling plate 96 is of roughly semicicular construction and includes a centrally located, vertically disposed opening 98. As will be appreciated, plates 96 and openings 98 are substantially vertically aligned.

A hollow reach guide 100, having a substantially rectangular cross section that corresponds to that of reach housing 40, projects forwardly from the octagonal end plate 94. Reach guide 100 is positioned to ensure its alignment with the reach housing 40 when bed assembly 36 is pivoted about the pivot bar 50 to some predetermined nominal position with respect to the trailer support assembly 34. Also included as part of rear end piece 92 is a pneumatic jeep latch 102 positioned forward of and slightly below the upper trailer coupling plate 96. Jeep latch 102 includes a vertically extendable and retractable actuator pin.

A rear bunk lock assembly 104 also connects side rails 80 slightly forward of the rear end piece 92. As shown in FIGS. 3 and 6, a pair of laterally spaced, forwardly projecting, vertical plates 106 are disposed adjacent the upper surface 108 of each side rail 80. The inner plates 106 on the two side rails 80 are coupled by an L-shaped actuator bracket 110 extending between the side rails 80. All four plates 106 include horizontal, axially aligned openings 112. A pneumatic rear bunk lock 114 is supported by the actuator bracket 110 midway between side rails 80 and includes locking pins 116 that extend laterally from each end. Under proper pneumatic control, locking pins 116 can be selectively extended and retracted through the openings 112 in the plates 106 above each side rail 80.

As noted previously, a bunk assembly 38 is slidably received with respect to bed assembly 36 between forward and rearward positions shown in FIG. 2. Addressing the elements of bunk assembly 38 in greater detail, it includes a pair of bunk sliders 118 designed to slidably engage the two side rails 80. As shown best in FIGS. 7 and 8, each slider 118 includes a base plate 120 constructed for parallel, longitudinal displacement with respect to the upper surface 108 of a side rail 80. Base plate 120 includes a downwardly projecting arm 122 that cooperates with the exterior of the side rail 80 to limit inward movement of the slider 118. Each base plate 120 also includes an inwardly projecting arm 124 to which a number of components, described below, are mounted.

The lower surface of the base plate 120, including the inner surface of arm 122, is covered with a suitable section 126 of bearing material, such as ultra-high molecular weight (UHMW) plastic to reduce friction between base plate 120 and the side rail 80 as the longitudinal position of the slider assembly 118 changes. A spacer plate 128, having a thickness slightly greater than that of side rail 80 and outer dimensions corresponding to those of the inwardly projecting arm 124 of base plate 120, is positioned on the section 126 of bearing material in substantial alignment with the inwardly projecting arm 124. Another piece 130 of bearing material is positioned over the spacer plate 128 and extends beyond spacer plate 128 toward the downwardly projecting arm 122. This piece 130 of bearing material is adhered or otherwise secured to a correspondingly dimensioned support plate 132.

The spacer plate 128, piece 130 of bearing material, and support plate 132 are conveniently bolted to the base plate 120. As will be appreciated, this construction of slider 118 defines an inverted L-shaped channel 134 between the section 126 of bearing material on the base plate 120 and its downwardly projecting arm 122 and the piece 130 of bearing material on support plate 132. With the upper portion of each U-shaped side rail 80 received within the channel 134, the slider assembly 118 is free to move longitudinally with respect to the side rail 80, while its lateral movement is limited by arm 122 and spacer plate 128 and its vertical movement is limited by base plate 120 and support plate 132.

Projecting upwardly from each base plate 120 are a pair of inwardly directed wings 136. A load scale 137 is secured to the upper surface of each base plate 120, midway between the wings 136. The load scales 137 support the ends of a horizontal bunk crosspiece 138. Unlike conventional bunk arrangements in which the crosspiece 138 is secured to the load scales 137, as suggested by FIG. 7, crosspiece 138 is preferably captivated by the cooperative action of the two inwardly directed wings 136, a cover plate 139 secured between the wings 136, and the enlarged ends 141 of the crosspiece 136. By captivating the crosspiece 136 and distributing the load of logs 16 across a longer base plate 120, the jarring forces transferred from the bunk assembly 38 to the bed assembly 36 during the transport of logs 16 are less likely to break the trailer's frame. Returning to the description of crosspiece 138, it includes a pivot plate 140 to which a bunk 142 is rotatably coupled by a shaft 143 projecting through a vertical opening in the pivot plate 140. The bunk 142 has a pair of arms 144 that extend upward from a horizontal base 146 to receivably engage the load of logs 16.

As shown in FIGS. 3 and 7, a front bunk latch arm 148 is secured to the top of the arm 124 of each slider base plate 120 near its forward end. More particularly, a pair of laterally spaced plates 150 extend upward from the base plate 120 and include aligned openings through which a pin 154 passes connecting the latch arm 148 therebetween. At the forward end of arm 148, a downwardly turned finger 156 is provided to cooperatively engage the latch plate 86 located on bed assembly 36. Each arm 148 may conveniently be spring-biased to maintain finger 156 in its downwardmost position during normal operation.

Addressing now the elements of the auxiliary trailer 30, reference is again had to FIGS. 2 and 3. As shown, auxiliary trailer 30 includes a horizontally disposed frame 158. At the forward end of frame 158, a pair of horizontal, forwardly projecting, vertically spaced-apart trailer coupling plates 160 are provided to cooperatively receive the lower trailer coupling plate 96 of the primary trailer 28 therebetween. Vertically aligned openings 162 extend through plates 160 and are of corresponding diameter to the opening 98 provided in plate 96. A pin 164, passed through openings 98 and 162, secures the three plates 96 and 160. A transport locking pin 165 projects downwardly from frame 158 to engage a portion of the truck hitch 26 when the trailer system 10 is hauled on the bed 20 of truck 12.

On the upper surface of the frame 158, slightly rearward of plates 160, a U-shaped reach guide channel 166 is provided. As will be described in greater detail below, with trailers 28 and 30 connected the guide channel 166 is aligned with the reach guide 100 provided at the rear end of trailer 28 to receive the reach 42, when rearwardly extended.

To the rear of guide channel 166 and below the frame 158, a suspension system 168 couples an axle-and-wheel assembly 170 to frame 158. As shown, axle-and-wheel assembly 170 includes an axle 172 having one wheel 58 located at each end.

Projecting forwardly and upwardly from the rear end of frame 158 is a V-shaped upper frame 174 supported with respect to frame 158 by brackets 176. At the forward apex 178 of upper frame 174, another pair of horizontal, forwardly projecting, vertically spaced plates 180 are provided corresponding to the lower plates 160. Like the lower plates 160, upper plates 180 include vertically aligned openings 182 and are designed to receive the upper trailer coupling plate 96 on primary trailer 28 therebetween. A pin 184 extends through the openings to secure plates 96 and 180 together.

Projecting forward from the topmost plate 180, is a horizontal, paddle-shaped jeep or lock plate 186. At the enlarged forward end of the plate 186, a plurality of vertically disposed openings 188 are provided in a forwardly convex array. As will be described in greater detail below, these openings 188 are designed for cooperative action with the pneumatic jeep latch 102 on primary trailer 28.

As will be appreciated, a majority of the components of primary trailer 28 and auxiliary trailer 30 are conveniently made of relatively strong metal such as steel or iron. Rigid connections between the various elements are achieved, for example, by welding, where subsequent disconnection will likely not be required. Alternatively, components can be conveniently bolted together where subsequent disconnection may be required. Further, suitable pneumatic and electrical connections and assemblies are provided as required.

Addressing now the air cushion system 32, as shown in FIGS. 2, 3 and 9, system 32 includes a separate, vertically aligned air bag 190 and air spring 192 positioned between each side rail 80 and the rear axle 62 of the primary trailer 28. Air bags 190 manufactured by Firestone under the product part number IT19E-1have been found to provide satisfactory operation. A top plate 194 secures the air bag 190 to side rail 80, while a bottom collar 196 connects the air spring 192 to axle 62. Both air bag 190 and air spring 192 are coupled by an air line to a controlled source of high pressure air. With the aid of regulators and valves, the air bags 190 can be selectively inflated and deflated to increase and decrease, respectively, the distance between side rails 80 and rear axle 62. Air spring 192 further provides a desirable suspension of the bed assembly 36 of primary trailer 28 with respect to the trailer support assembly 34.

As noted previously, the above-described trailer system 10 is connected to the truck by way of an adjustable hitch assembly 26 provided on truck 12. As shown in FIGS. 10 and 11, hitch assembly 26 includes a hitch arm 198 that is coupled by a horizontal pin 200 to the bed 20 of truck 12 a predetermined distance from the rear end of the bed 20. In this manner, arm 198 is made vertically pivotable with respect to bed 20.

As shown, arm 198 projects a short distance behind the rear end of truck 12 through an upwardly open, U-shaped rear end bracket 202 on truck bed 20. The projecting end of arm 198 is provided with a hitch element 204 that includes a roughly upwardly directed post 206 for receipt within the hitch eyelet 46 of reach 42. A hitch cap 208 is selectively operable between an open position, in which it is spaced from hitch post 206, and a closed position, in which it abuttingly contacts the projecting end of post 206. This selective operation of hitch cap 208 is achieved with the aid of a pneumatic canister 210 provided on the lower end of the hitch element 204. A transport lock plate 211 extends from the upper surface of the latch arm 198 at a point slightly forward of the hitch element 204. Plate 211 includes a rectangular opening 213 constructed to receive the transport locking pin 165 provided on auxiliary trailer 30 when trailer system 10 is loaded on the bed 20 of truck 12, as described in greater detail below.

The rear end bracket 202 of truck bed 20 defines a hitch arm support surface 212 upon which a pair of vertically aligned air bags 214 are positioned. As will be appreciated, by applying a controlled supply of air to air bags 214, the relative spacing of hitch arm 198 and support surface 212 can be controlled. More particularly, by increasing the volume of air introduced into air bags 214, hitch arm 198 is lifted with respect to support surface 212. Alternatively, the hitch arm 198 can be lowered by exhausting air from the air bags 214. Air bags 214 manufactured by Firestone under the product part number 6910 have been found to provide satisfactory operation.

During normal use of hitch assembly 26, the upward limit of travel for hitch arm 198 is established by a latch arm 216. Latch arm 216 is pivotably secured by a bolt 218 between a pair of vertical plates 220 provided on one end of the U-shaped bracket 202. With latch arm 216 pivoted to close the opening formed by bracket 202, its free end is received between another pair of vertical plates 222 formed on the other end of bracket 202. A plurality of horizontal, axially aligned openings 224 extend through plates 222 and the latch arm 216, allowing a pin 226 to be inserted therethrough securing the latch arm 216 in place.

Alternatively, pin 226 can be removed and latch arm 216 pivoted open to allow the hitch arm 198 to be vertically pivoted a distance slightly more than 90°. In this position, shown in the broken line views of FIGS. 10 and 11, hitch arem 198 projects upward and slightly forward. Its travel is ultimately limited by a cushioned stop 228 secured to the truck bed 20 adjacent the pivotal connection of the hitch arm 198.

Having described the various elements of the truck-and-trailer combination 14 shown in FIG. 1, its operation will now be described. Prior to being loaded with logs 16 at a logging site, the trailer system 10 must be coupled to the truck 12. Assuming that pins 164 and 184 are appropriately passed through the trailer coupling plates 96, 160, and 180 and that the appropriate pneumatic and electric connections are made between the primary and auxiliary trailers 28 and 30, trailer system 10 is ready to be connected to truck 12.

First, reach 42 is drawn forward through reach housing 40, with the various reach sections 44 "telescoping" to provide the desired extension of reach 42 and, hence, spacing of bunks 22 and 142 when sliding bunk assembly 38 is locked in its rear position. The truck 12 is then maneuvered to position the hitch element 204 of the adjustable truck hitch assembly 26 relatively close to the trailer hitch eyelet 46 at the end of reach 42. At this time, the relative heights of the truck hitch post 206 and trailer hitch eyelet 46 are visually determined. The supply of air to the air bags 214 positioned below truck hitch arm 198 is then adjusted to lower hitch arm 198, if necessary, to bring the projecting end of post 206 below hitch eyelet 46. As will be appreciated, the pneumatic controls for adjusting the air supply can be conveniently located either at the rear of the truck bed 20 or in the cab section 18 of truck 12.

Next, truck 12 is further maneuvered so that the truck hitch post 206 is vertically aligned below the opening in the trailer hitch eyelet 46. Pneumatic control over air bags 214 is again exercised, raising the hitch arm 198 and engaging hitch eyelet 46 about post 206. At this point, control over the hitch cap 208 is exercised, with air from canister 210, to close the gap between post 206 and cap 208. As a result, the trailer system 10 is securely connected to truck 12 and the appropriate pneumatic and electrical connections between truck 12 and trailer system 10 are provided.

As will be appreciated, the terrain at a logging site is frequently uneven. The inclusion of the air bags 214 below hitch arm 198, however, conveniently allows the vertical relationship of the truck hitch element 204 and the trailer hitch eyelet 46 to be adjusted as desired, at least partially independent of such terrain variations. For example, when the truck 12 is on slightly higher ground than trailer system 10, the volume of air in air bags 214 can be decreased until the hitch element 204 is lowered below the plane of hitch eyelet 46. Alternatively, air bags 214 can be used to raise hitch element 204 to a desired vertical position with respect to eyelet 46 when truck 12 is on lower ground than trailer system 10. The pivotable nature of a hitch assembly 26 constructed in this manner, also allows a walking beam type truck 12 to be used in combination with a walking beam type trailer system 10 without resulting in intolerable ride characteristics.

With the trailer system 10 connected to truck 12 as described above, logs 16 are loaded with conventional logging equipment into the truck-and-trailer combination 14. More particularly, as shown in FIG. 1, the logs 16 extend longitudinally along the trailer system 10 and are received near their forward end by the truck bunk 22 and near their rear end by the primary trailer bunk 142. While the logs 16 can be secured to bunks 22 and 142 with, for example, chains, the frictional force between adjacent logs 16 and bunks 22 and 142 may be sufficient to ensure that the load will stay in place during transportation.

As will be appreciated, a trailer system 10 constructed in the manner described above distributes the weight of logs 16 over a substantial portion of the road and increases the load-carrying capacity of the combination 14 via the inclusion of the auxiliary trailer 30. More particularly, the load received by truck 12 and primary trailer 28 is, in part, distributed to the auxiliary trailer 30 by the overlapping trailer coupling plates 96, 160, and 180 that join the primary and auxiliary trailers 28 and 30. Thus, the axle-and-wheel assembly 170 of the auxiliary trailer 30 bears a portion of the load and increases the carrying capacity of the combination 14, even though the logs 16 are not in direct contact therewith.

The precise manner in which the load is distributed over the various axles 54, 56, 62 and 172 is a function of a variety of factors including, for example, axle placement and spacing. While the influence of most of these factors is relatively constant, the inclusion of air cushion system 32 offers some control over load distribution. More particularly, by increasing the volume of air in air bags 190, the rear end of primary trailer bed assembly 36 and the secondary trailer 30 pivot upward about pivot bar 50, lifting the rear end of logs 16. As a result, the load upon axle 62 increases, while the load upon axles 54, 56, and 172 decreases. Alternatively, by decreasing the volume of air in air bags 190, a portion of the load is transferred to axles 54, 56, and 172. Thus, some limited control over the distribution of the load can be achieved.

At some point prior to the unloading of logs 16, it may be necessary to back the truck-and-trailer combination 14 into a desired postion. With a conventional dualtrailer system this can be quite difficult, because the driver has limited control over the second trailer. A trailer system 10 constructed in accordance with this invention, however, allows the truck-and-trailer combination 14 to be relatively easily maneuvered in reverse. More particularly, as shown in the comparative views of FIGS. 2 and 9, the air cushion system 32 can be used to lift the axle-and-wheel assembly 170 of the auxiliary trailer 30 from the ground.

In that regard, when the auxiliary trailer 30 of a loaded trailer system 10 is to be lifted, the sliding bunk assembly 38 is first moved into its forward position, as shown in FIG. 9, to remove the load from the auxiliary trailer 30. This is accomplished by setting the brakes on trailer system 10 and moving truck 12 forward. While the use of a conventional compensating reach 42 allows the relative position of truck 12 and trailer system 10 to increase, the frictional force of logs 16 against bunks 22 and 144 maintains the bunk's spacing and sliding bunk assembly 38 will be drawn forward. With the load removed from auxiliary trailer 30, air cushion system 32 is then able to lift trailer 30 relatively easily. If the trailer system 10 does not contain a load of logs 16, the air cushion system 32 can be used to lift trailer 30 independent of the position of bunk assembly 38.

Addressing now the operation of air cushion system 32 in greater detail, operator controls located, for example, in the cab section 18 of truck 12 are used to control the volume of air introduced into the air bags 190 located on each side of the primary trailer 28. When additional air is supplied to the bags 190, the bed assembly 36 of primary trailer 28 pivots about bar 50, lifting the rear end of the bed assembly 36 with respect to the trailer support assembly 34. Because the auxiliary trailer 30 is connected to the primary trailer 28 by the cooperative action of the trailer coupling plates 96, 160, and 180, the auxiliary trailer 30 also pivots upward about pivot bar 50. Given the slidable engagement of the rear axle leaf springs 65 in their respective rear bed mounts 69 illustrated by a comparison of FIGS. 2 and 9, however, air cushion system 32 is not required to lift the rear axle-and-wheel assembly 52. Operator control over air bag 190 inflation is continued until the axle-and-wheel assembly 170 is lifted from the ground as shown in FIG. 9. At this time, the truck-and-trailer combination 14 can be easily maneuvered backward without the axle-and-wheel assembly 170 of the auxiliary trailer 30 influencing the direction of travel of trailer system 10.

As an alternative to the use of air cushion system 32, auxiliary trailer 30 can also be lifted by shifting the center of gravity of the trailer system 10 forward of the pivot bar 50. For example, with the bed assembly 36 of primary trailer 28 constructed to allow the sliding bunk assembly 38 to be moved forward sufficiently to place the center of gravity of the loaded bunk 144 forward of pivot bar 50, the bed assembly 36 of primary trailer 28 and the auxiliary trailer 30 will pivot upward when the bunk assembly 38 is locked in its forward position. As noted above, the relative position of the loaded bunk assembly 38 with respect to primary trailer 28 is easily adjusted by setting the brakes on trailer system 10 and moving truck 12 forward or backward.

While the trailer coupling plates 96, 160, and 180 rigidly secure the auxiliary trailer 30 against vertical movement with respect to the bed assembly 36 of primary trailer 28, the auxiliary trailer 30 is still free to pivot about pins 164 and 184 through a variety of positions such as those shown in the solid and broken line views of FIG. 13. As a result, when the auxiliary trailer 30 is lifted by the operation of air cushion system 32 in the manner described above, it is free to swing from side-to-side. To prevent possible equipment damage or personnel injury in the event of an abrupt position change, as well as to provide a desired alignment of the auxiliary trailer 30 with respect to the primary trailer 28 when the auxiliary trailer 30 is lowered to the ground, the pneumatic jeep latch 102 and jeep lock plate 186 are included on the primary and auxiliary trailers 28 and 30, respectively, to secure the relative position of the two trailers.

More particularly, with the auxiliary trailer 30 lifted from the ground by the air cushion system 32, the auxiliary trailer 30 is swung to a desired position with respect to the primary trailer 28. The position of the auxiliary trailer 30 is then adjusted slightly such that an appropriate opening 188 in the jeep lock plate 186 is aligned above the actuator pin of the jeep latch 102. At this point, the operator controls are used to actuate the jeep latch 102, causing the pin to extend upwardly through the opening 188, securing the relative position of trailers 28 and 30 until the latch 102 is deactuated.

Turning now to a discussion of the interaction between trailer system 10 and logs 16, if logs 16 are to be hauled by the truck-and-trailer combination 14, bunks 22 and 142 must be able to accommodate changes in the relationship between logs 16 and truck-and-trailer combination 14. For example, as combination 14 turns a corner, truck 12 and trailer system 10 necessarily fall out of longitudinal alignment ment and define some angle with respect to each other. As will be appreciated, if bunks 22 and 142 were secured against rotation, the logs 16 would prevent this change in alignment. More particularly, bunk 22 would tend to cause the logs 16 to remain longitudinally aligned with respect to truck 12, while bunk 142 would tend to cause trailer system 10 to remain aligned with logs 16. With bunks 22 and 142 pivotally mounted as described above, however, the logs 16 can fall out of alignment with truck 12 and system 10, allowing the truck-and-trailer combination 14 to turn.

A second adjustment in the relative position of bunks 22 and 142 is also required when the truck-and-trailer combination 14 turns a corner. To understand this adjustment, first assume that the truck-and-trailer combination 14 is longitudinally aligned prior to being loaded with logs 14. The bunk 142 is locked in a rearward position with respect to bed assembly 36 as described in greater detail below and the extension of reach 42 is adjusted to provide the desired spacing of bunks 22 and 142. More particularly, with bunk 22 positioned adjacent the forward end of the logs 16 the reach 42 is adjusted to position bunk 142 adjacent the rear end of logs 16.

Once the logs 16 are loaded, the spacing between bunks 22 and 142 along logs 16 will remain substantially the same because the frictional force between logs 16 and bunks 22 and 142 limits slippage therebetween. When a corner is turned and the truck 12 and trailer system 10 are brought out of alignment, however, the distance between a particular point on the truck 12 and a given point on trailer system 10 decreases due to the angular orientation of system 10 and truck 12. Because the separation of bunks 22 and 142 remains substantially the same under the influence of logs 16, a conventional compensating reach 42 is employed, which slips with respect to bed assembly 36 to accommodate this change.

A similar shift in bunk 142 position occurs when the air cushion system 32 is used to pivot the bed assembly 36 of trailer 28 and the trailer 30 about pivot bar 50. More particularly, as described in greater detail below, bunk 142 is locked in a forward position at this time. The upward motion of bunk 142 then bring bunks 22 and 142 out of horizontal alignment and would tend to decrease their spacing were it not for the influence of logs 16. The frictional force of logs 16, however, maintains the spacing of bunks 22 and 142 with the aid of compensating reach 42, which allows the separation of primary trailer 28 and truck 12 to shift.

Figure 12:
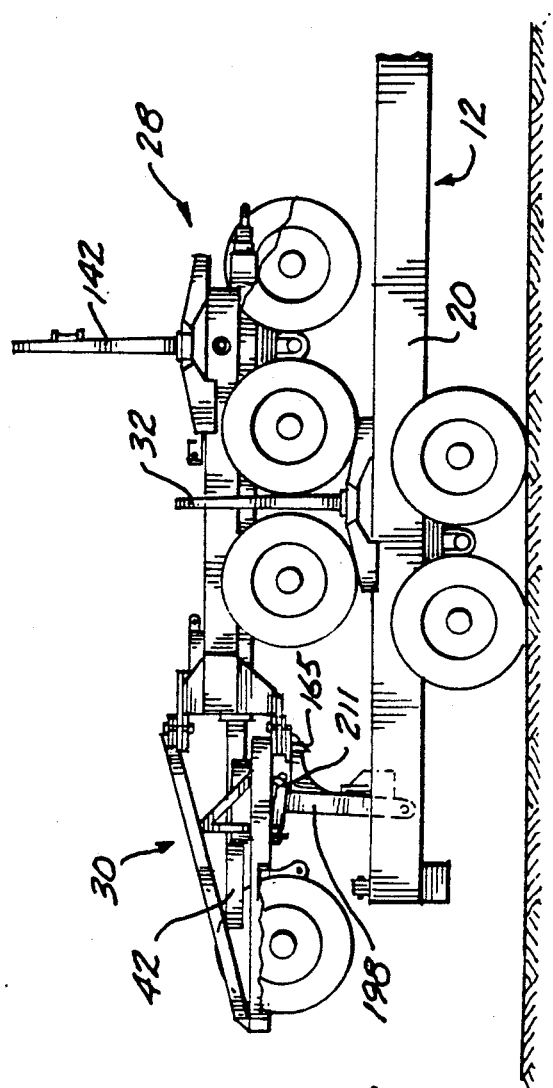
FIG. 12 is a side view of the log trailer system of FIG. 1 loaded on the bed of the truck.

Once the truck-and-trailer combination 14 has reached a sawmill or other destination, the logs 16 can be unloaded with conventional logging equipment. At that point, it may be desirable to disconnect trailer system 10 and locate it on the bed 20 of truck 12, as shown in FIG. 12. With trailer system 10 carried "piggyback" in this manner, the maneuberability of the combination 14 is significantly enhanced for the return trip to the logging site.

Prior to loading trailer system 10, the air and electrical connections between truck 12 and trailer system 10 are disconnected. The reach 42 of trailer system 10 is then disconnected from the adjustable hitch assembly 26 of truck 12 in the following manner. First, hitch cap 208 is pneumatically disengaged from hitch post 206. Next, the volume of air in air bags 214 is decreased with the aid of operator controls to lower hitch arm 198 with respect to the rear end bracket 202 of truck 12. As a result, the truck hitch post 206 drops through the trailer hitch eyelet 46 and truck 12 can be driven forward of the disengaged trailer system 10.

To lift trailer system 10 to the bed 20 of truck 12 for a return trip, it is desirable that the trailer system 10 be secured as a relatively rigid unit. In this regard, the bed assembly 36 of primary trailer 28 and the auxiliary trailer 30 are locked in place with respect to the reach housing 40 and prevented from pivoting about pivot bar 50 or pins 164 and 184. More particularly, the air cushion system 32 is first activated to bring reach 42 into alignment with the reach guide 100 at the rear end of the primary trailer bed assembly 36. Given the rigid vertical coupling between auxiliary trailer 30 and bed assembly 36, provided by plates 96, 160 and 180, the reach guide channel 166 on auxiliary trailer 30 will be simultaneously brought into alignment with reach 42. As shown in FIG. 12, reach 42 is then extended rearwardly through guides 100 and 166, "locking" the primary and auxiliary trailers 28 and 30 together. At this time, the bed assembly 36 of primary trailer 28 is no longer free to pivot about pivot bar 50 and the auxiliary trailer 30 is prevented from pivoting about pins 164 and 184 by the combined operation of reach 42 and reach guide channel 166.

Before lifting trailer system 10, it is also desirable to lock the sliding bunk assembly 38 in position with respect to the bed assembly 36 of primary trailer 28. As will be appreciated, if bunk assembly 38 were left free to slide, a significant change in the weight distribution of trailer system 10 could occur. This could lead to a sudden imbalance that would make it difficult to safely control system 10.

To lock bunk assembly 38 in its forward position, the bunk assembly 38 is slid forward on bed assembly 36. As will be appreciated from FIGS. 3 and 5, because the forward surface of the finger 156 of each bunk latch arm 148 is tapered, it will pivot upward when it first contacts the adjacent front latch plate 86 on the bed assembly 36. As the finger 156 passes forward of latch plate 86, it will drop down and the cooperative action of finger 156 and latch plate 86 will secure the bunk assembly 38 against movement.

The latch arms 148 can be automatically released with the aid of the pneumatic latch releases 90 positioned slightly forward of and below the latch plates 86. For example, the release 90 can be pneumatically controlled to cause an actuator to project upwardly through the opening 88 in end piece 82, forcing the finger 156 upward until it clears the latch plate 86. At this time, the bunk assembly 38 can be slid backward to its unlocked range.

Alternatively, the rear locking mechanism shown in FIGS. 3 and 6 can be used to lock bunk assembly 38 in a rear position as follows. Bunk assembly 38 is moved rearward along bed assembly 36 until the opening 141 in the vertical rear lock plate 139 that is provided on each side of the sliding bunk assembly 38 is aligned with the corresponding openings 112 in the lock plates 106 positioned on each side rail 80. At that time, the rear bunk lock 114 is pneumatically operated to cause locking pins 116 to extend outwardly through the aligned openings 112 and 141, on each side of trailer 28, causing the bunk assembly 38 to be securely locked in place. The bunk assembly 38 is released by causing bunk lock 114 to retract the locking pins 116.

With bunk assembly 38 locked in place, the entire trailer system 10 is relatively rigidly secure and ready to be lifted to the bed 20 of truck 12. The assembly is engaged by standard logging equipment with the aid of lift ring assembly 74 and a conventional, adjustable cable 230 extending from one side of the rear end of primary trailer 28, forward to assembly 74, and then back to the other side of the rear end of trailer 28. With both lift assembly 74 and cable 230 coupled to the logging equipment, trailer system 10 can be lifted in a substantially balanced manner.

Once the trailer system 10 has been raised for loading on the bed 20 of truck 12, it is positioned to be securely held on bed 20. As shown in FIG. 12, at this time the hitch arm 198 on truck 12 can be raised to the relatively vertical position in which it is supported by cushioned stop 228. Trailer system 10 is then lowered to the bed 20 of truck 12 so that the truck bunk 22 is positioned between the center and rear axles 56 and 62 of primary trailer support assembly 34. With the transport lock pin 165 on the auxiliary trailer 30 passed through the opening 213 in the transport lock plate 211, the hitch assembly 26 helps support trailer system 10. Chains can further be used to securely couple the trailer system 10 to bed 20 for transport. The truck-and-trailer combination 14 can then be returned quickly and easily to a logging site, where the trailer system 10 is unloaded from bed 20 and the above process repeated.

Those skilled in the art will recognize that the embodiments of the invention disclosed herein are exemplary in nature and that various changes can be made therein without departing from the scope and the spirit of the invention. In this regard, the invention is readily embodied with various means for inducing relative motion between the bed assembly 36 and trailer support assembly 34 of primary trailer 28, as well as for inducing adjustment of the position of hitch arm 198 and the adjustable hitch assembly 26. For example, pneumatic or hydraulic cylinders can be employed in place of air bags 190 and 214. Further, it will be recognized that various structural mechanisms can be employed to provide the desired relative locking of the bed assembly 36 of primary trailer 28 and the auxiliary trailer 30 to reach 42. It will also be appreciated that a trailer system 10 employing the features described above has numerous applications outside the logging industry. For example, the hauling of any relatively long rigid cargo, such as I-beams, pipe, or tubing, can be particularly advantageously accomplished with a trailer system constructed in the manner described above. Because of the above and numerous other variations and modifications that will occur to those skilled in the art, the following claims should not be limited to the embodiments illustrated and discussed herein.

The embodiments of the invention in which an exclusive property or privilege is claimed are defined as follows:

1. A system for supporting a load and allowing the load to be transported over a roadway, said system comprising:
   a bed assembly having first and second ends, said bed assembly being vertically pivotable about a point adjacent its first end and being for contacting and movably supporting the load; and
   an auxiliary trailer for additionally movably supporting the load,
   said auxiliary trailer being pivotably connectable to said bed assembly adjacent said second end of said bed assembly for substantially lateral movement with respect to said bed assembly.

2. A trailer system for supporting a load and allowing the load to be transported with the aid of a vehicle, said system comprising:
   a load-contacting trailer having a bed assembly for contacting and supporting said load and an axle-and-wheel assembly coupled to said bed assembly for movably supporting said bed assembly, said load-contacting trailer being for movably supporting said load;
   an auxiliary trailer, coupled to said load-contacting trailer, having an axle-and-wheel assembly for movably supporting said auxiliary trailer, said auxiliary trailer being for additionally movably supporting said load;
   connection means for connecting said load-contacting trailer to the vehicle, said bed assembly of said load-contacting trailer being rotatably coupled to said connection means; and
   means for rotating said auxiliary trailer and said bed assembly of said load-contacting trailer upward relative to said axle-and-wheel assembly of said load-contacting trailer to raise said axle-and-wheel assembly of said auxiliary trailer relative to said axle-and-wheel assembly of said load-contacting trailer and enhance the control over said trailer system when it is moved backwards by the vehicle.

3. The trailer system of claim 2, wherein said load-contacting trailer and said auxiliary trailer are coupled for relative movement in only a substantially horizontal direction.

4. The trailer system of claim 3, wherein said connection means comprises a reach and a reach housing, said reach housing supporting said reach and said reach extending between the vehicle and said axle-and-wheel assembly of said load-contacting trailer, said bed assembly of said load-contacting trailer being pivotably connected to said reach housing intermediate the vehicle and said axle-and-wheel assembly of said load-contacting trailer.

5. The trailer system of claim 4, wherein said bed assembly and said axle-and-wheel assembly of said load-contacting trailer may have a spacing therebetween and wherein said means for rotating said auxiliary trailer and said bed assembly of said load-contacting trailer upward relative to said connection means comprises extension means, connected between said bed assembly and said axle-and-wheel assembly of said load-contacting trailer, for adjusting the spacing between said bed assembly and said axle-and-wheel assembly of said load-contacting trailer.

6. The trailer system of claim 5, wherein said connection means further comprises an axle-and-wheel assembly secured to said reach housing adjacent the pivotable connection between said reach housing and said bed assembly of said load-contacting trailer.

7. The system of claim 6, wherein said load-contacting trailer further comprises a bunk for receiving and retaining the load, said bunk being connected to said bed assembly and being slidable along said bed assembly along an axis parallel to said reach and being pivotable relative to said bed assembly.

8. The system of claim 7, wherein said auxiliary trailer further comprises reach-receiving means, said reach being slidable relative to said load-contacting trailer to allow said reach to be received by said reach-receiving means of said auxiliary trailer, securing the relative positions of said load-contacting trailer and said auxiliary trailer.

9. The trailer system of claim 4, wherein said connection means further comprises an axle-and-wheel assembly secured to said reach housing adjacent the pivotable connection between said reach housing and said bed assembly of said load-contacting trailer and wherein said load-contacting trailer further comprises a bunk for receiving and retaining the load, said bunk being connected to said bed assembly and being slidable along said bed assembly between first and second positions, said first position being between the vehicle and the pivotable connection between said reach and said bed assembly of said load-contacting trailer, said load tending to raise said axle-and-wheel assembly of said auxiliary trailer relative to said axle-and-wheel assembly of said load-contacting trailer.

10. The trailer system of claim 6, wherein said load-contacting trailer further comprises means for pivotably coupling said axle-and-wheel assembly of said load-contacting trailer to said bed assembly of said load-contacting trailer.

11. The trailer system of claim 6, wherein said means for rotating said auxiliary trailer and said bed assembly of said load-contacting trailer is further for controlling the distribution of said load over said trailer system.

12. The trailer system of claim 7, wherein said bunk is slidable between first and second positions defined with respect to said bed assembly.

13. The trailer system of claim 12, wherein said first position is aligned with the pivotable connection between said reach housing and said bed assembly of said load-contacting trailer, said auxiliary trailer supporting substantially none of said load when said bunk is in said first position.

14. The trailer system of claim 7, wherein said bunk further comprises a crosspiece and first and second sliders, said first and second sliders captively engaging said crosspiece and slidably engaging said bed assembly, said crosspiece and said first and second sliders cooperatively distributing said load across a relatively large portion of said bed assembly to reduce potential damage to said bed assembly.

* * * * *